H. L. JOHNSTON.
REFINING MACHINE FOR COFFEE.
APPLICATION FILED DEC. 17, 1910.
1,017,056.
Patented Feb. 13, 1912.
2 SHEETS—SHEET 1.
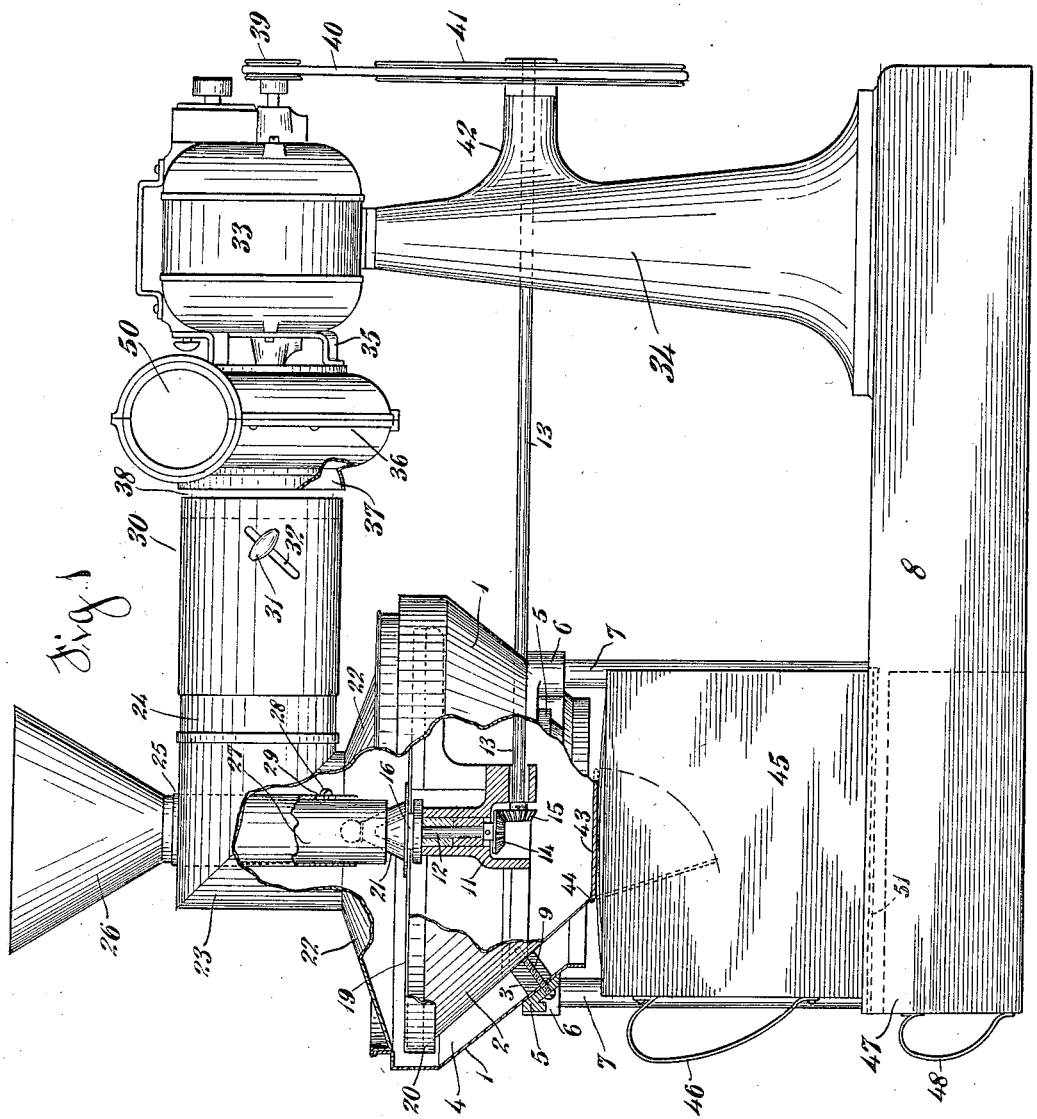
Witnesses
Anna F. Dienst
A. Smith
Inventor
Herbert L. Johnston
by Alfred M Allen
Attorney H. L. JOHNSTON.
REFINING MACHINE FOR COFFEE.
APPLICATION FILED DEC. 17, 1910.
1,017,056.
Patented Feb. 13, 1912.
2 SHEETS—SHEET 2.
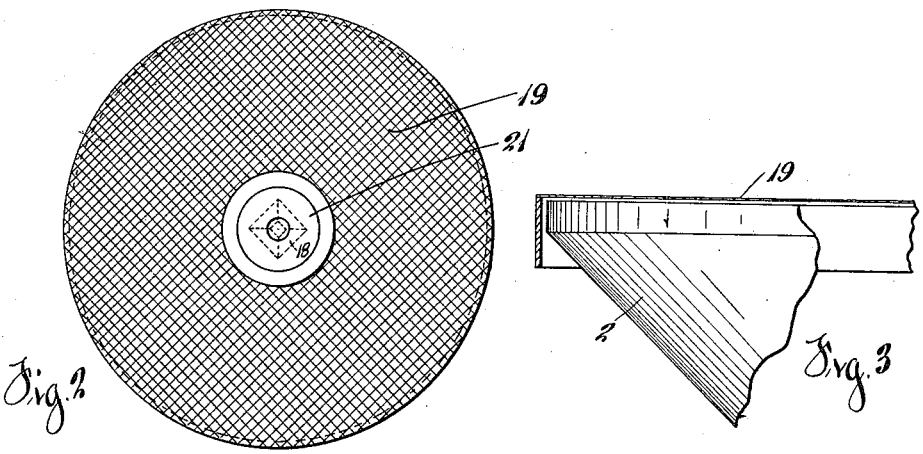
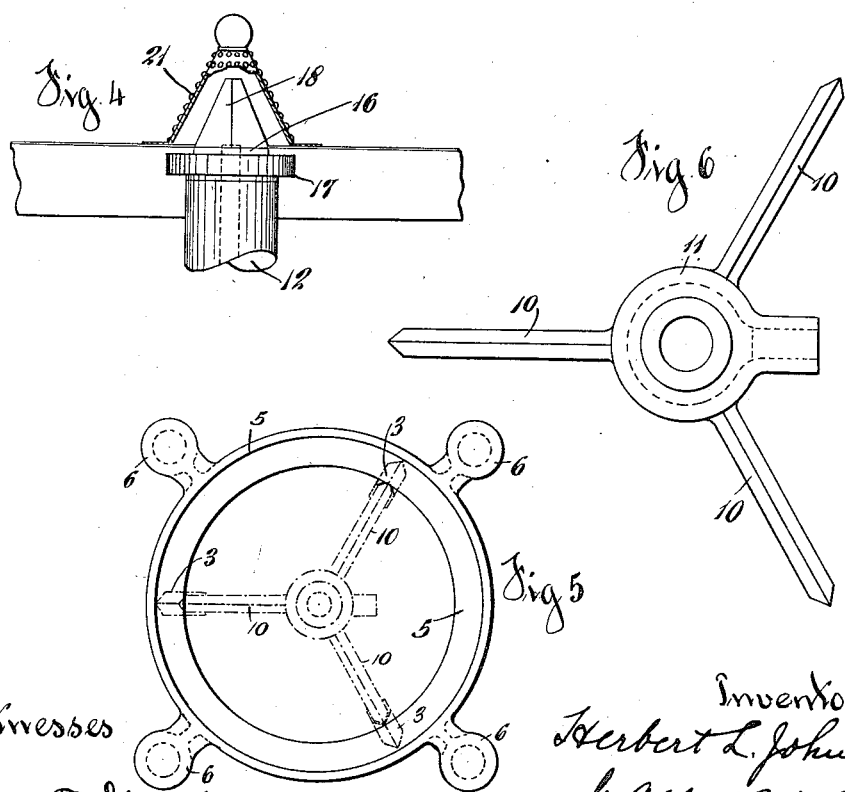

UNITED STATES PATENT OFFICE.

HERBERT L. JOHNSTON, OF TROY, OHIO, ASSIGNOR TO THE HOBART ELECTRIC MANUFACTURING COMPANY, OF TROY, OHIO, A CORPORATION OF OHIO.

REFINING-MACHINE FOR COFFEE.

1,017,056.  Specification of Letters Patent.  Patented Feb. 13, 1912.

Application filed December 17, 1910. Serial No. 597,765.

*To all whom it may concern:*

Be it known that I, HERBERT L. JOHNSTON, a citizen of the United States, and a resident of the city of Troy, in the county of Miami and State of Ohio, have invented certain new and useful Improvements in Refining-Machines for Coffee, of which the following is a full, clear, and exact description, reference being had to the accompanying drawings, forming part of this specification.

The object of my invention is to provide an effective apparatus for removing the chaff from ground coffee, and the invention consists of that certain novel construction and arrangement of parts to be hereinafter particularly pointed out and claimed, whereby the ground coffee may be evenly and effectively spread out by centrifugal force upon a rapidly revolving horizontally disposed sieve or plate, and during its passage through the machine the ground material may be subjected to a uniform and properly controlled air blast to separate out the chaff and other refuse from the ground material.

Another object is to provide a construction in which the chaff alone may be removed from the coffee delivered to the refining machine, or when desired the coffee may be graded and the dust, of such degree of pulverization as desired, may be simultaneously separated from the coffee by an additional separator, and to this end I have provided a convenient construction for changing the centrifugal plates or sieves as occasion may require.

In the drawings, Figure 1 is a side elevation of my improved machine partly in vertical section. Fig. 2 is a plan view of the distributing sieve. Fig. 3 is a detail section of a portion of the sieve and the fixed receptacle over which it fits. Fig. 4 is a detail view of the sieve support with a portion of the sieve in vertical section. Fig. 5 is a plan view of the supporting ring for the refining vessels. Fig. 6 is a plan view of the central support with the operating parts.

The main body portion of the refiner is formed, in the preferred construction, of two concentric, funnel-shaped annular vessels 1 and 2, of sheet metal or other suitable material, spaced apart by spacing blocks 3, 3, to leave an annular passageway 4 between the two vessels, and these vessels are mounted on an annular casting 5, provided with bosses 6, 6, in which are secured the legs or standards 7, 7, for holding the apparatus a suitable distance above the base plate 8 of the machine. As the main purpose of this construction is to provide the annular passageway 4, it will be understood that the inner vessel may be omitted, and such annular passage formed between the inner and outer walls of a single vessel, in which 1 would form the outer wall, and 2 the inner wall. The two vessels and the supporting casting 5 are secured together by the screws 9 inserted through the ring casting and the spacing blocks, which screws take into the ends of the arms 10, 10, of the hollow casting 11, mounted centrally within the inner vessel 2. This casting 11 is hollow vertically and horizontally to provide journal bearings for the vertical shaft 12 and the horizontal shaft 13 provided respectively with intermeshing beveled gears 14 and 15. On the upper end of the shaft 12 is secured the sieve support 16, provided with a flanged base 17 which rides on the upper face of the vertical portion of the casting and supports the shaft 12 in position. This sieve support 16 is squared and formed in the shape of a pyramid 18 for its upper portion.

19 is a disk of sheet metal or a sieve provided with a depending flange 20, and this sieve has a central square opening therein which fits over the squared portion of the sieve support so as to mount the sieve thereon, and over this square opening a cone-shaped cover 21 is secured so as to form a suitable cover for the sieve support, and also to serve as an agitator to prevent clogging and to distribute the coffee delivered from the hopper upon the disk or sieve, and for this purpose the cone may be roughened or provided with wings on its outer surface.

The outer funnel-shaped vessel 1 is open below, but is provided with a close fitting cover 22 which fits over the upturned flange of the outer vessel. The central portion of this cover 22 is formed into an elbow 23, upon the lateral opening of which is fitted the horizontal sheet metal pipe 24. In a circular opening in the upper portion of the elbow 23 is fitted and secured the discharge tube 25 of the hopper 26, which hopper primarily receives the ground coffee and discharges the same through the downwardly extending discharge tube 25 upon the cone-shaped central portion 21 of the sieve or plate 19.

Fitted inside the discharge tube 25 is a telescopic extension tube 27 secured to the tube 25 by set screw 28 which projects through a suitable slot 29 in the tube 25, so that the extension tube can be adjusted vertically and held in the desired position in the discharge tube 25 of the hopper. This extension tube extends down over the cone-shaped upwardly projecting portion of the sieve or plate 19, and by adjusting the tube 27 the annular discharge opening at the bottom of the tube can be increased or diminished as desired.

Mounted on the lateral pipe 24 extending over the elbow is a sieve extension 30 secured to the pipe 24 by the thumb screw 31, which takes through the diagonal slot 32 in the sieve 30, so that by loosening the thumb screw and rotating the sleeve, the length of the extension may be increased or diminished.

While any suitable motive power may be employed for driving my apparatus, I prefer to provide an electric motor which is indicated at 33, the casing for which is mounted on the pedestal 34 erected on the base plate 8 at a convenient distance from the refiner. Secured to the motor casing by suitable brackets 35 is a suction blower 36 of any desired construction, the fans of which are driven in any desired way from the armature shaft of the motor, and the lateral suction opening 37 of this blower is presented to the open end of the adjustable sleeve 30 forming the air blast conduit from the refiner. The force of the suction through the pipe is regulated by adjusting the sleeve 30. When the full force of the blower is exerted, the sleeve 30 is projected into the lateral opening in the blower so as to close the opening, and if it is desired to reduce the force of the blower, the sleeve is adjusted so as to leave greater or less of an opening 38 at the end of the sleeve. The electric motor is also provided with the grooved pulley 39 which, by a suitable cord or belt 40, drives the grooved pulley 41, mounted on the end of the shaft 13, journaled in the lateral arm 42 of the motor pedestal.

The inner vessel 2 over which the sieve or plate 19 is fitted is provided with a lid or trap door 43 to close the lower end of the vessel, which trap door is hinged at 44, so as to allow the trap door to drop open as indicated by dotted lines in Fig. 1, when the support for the trap door is removed, and this trap door is supported in any suitable way by the upper portion of the receiving can 45 for the refined coffee, which is located beneath the discharge from the funnels and supported on a grid 51 inserted in an opening in the base plate 8 between the supporting standards 7. The receiving can is provided with a handle 46 for manipulating the can; while underneath the receiving can for the refined coffee is another can 47, provided with a handle 48, which can is intended to receive the dust deposited in the inner receptacle when the ground coffee can is removed, and the trap door 43 opens to allow the dust to drop through the grid into the can.

The operation of the apparatus will be evident from the foregoing description.

The apparatus is designed to use sieves of various sizes of mesh, or an unperforated sheet metal flanged plate can be used in place of the sieves, when it is not desired to sift the dust into the inner receptacle, so that all sieves and plates are made interchangeable. The operator selects the desired sieve or plate, and having removed the cover 22, he mounts the sieve upon the sieve holder by fitting the square opening in the sieve over the corresponding projection on the holder, as hereinbefore described. The amount of the annular discharge opening around the central portion of the sieve is then adjusted as desired and the cover replaced. The ground coffee is then delivered into the hopper 26 and the driving power of the refiner turned on to actuate the blower and rotate the shaft 13. The rotation of the shaft 13 drives the vertical shaft 12 and the sieve holder with the sieve thereon at a high rate of speed, and the coffee is agitated and prevented from clogging at the mouth of the discharge tube by the cone, and is spread out by the centrifugal force into an even and uniform layer and projected over the edge of the sieve holder while the current of air entering the annular passage 4 at the bottom of the receptacle draws the chaff into the blower and out through the opening 50, or into a suitable conduit connected therewith. Where a sieve has been selected, as the ground coffee passes over the top surface of the sieve, the fine dust drops into the inner receptacle into which the air is prevented from entering by the trap door 43, and the dust is held there until the receiving can 45 is withdrawn, which allows the trap door to open and the dust to fall through the grid which supported the receiving can into the lower receiving can. Where it is not desired to sift the coffee but merely to remove the chaff,—instead of a sieve, the operator selects a similarly flanged imperforate plate and mounts it upon the sieve holder in the same way, and proceeds as before.

With my apparatus, it will be understood that any desired cleaning or refining of the coffee may be readily accomplished, and that the flow of the coffee from the hopper, the speed with which it is spread out over the rotating plate, and the power of the suction may all be regulated as desired, so that the machine is adapted for any and all conditions.

Having thus described my invention, what I claim as new and desire to secure by Letters Patent, is:—

1. In a coffee refiner, an inner and an outer funnel shaped vessel spaced apart to form an annular passage between them through which the coffee falls by gravity, a disk forming a cover for the inner vessel mounted horizontally over said inner vessel, with means for rotating the disk, a hopper with discharge tube therefor over the central portion of said disk, and means for creating an air blast through the annular passageway opposed to the movement of the coffee with the inner vessel inclosed from access to the air.

2. In a coffee refiner, an inner and an outer vessel spaced apart to form an annular passage between them through which the coffee falls by gravity, a disk mounted horizontally above said annular passage, with means for rotating the disk, a hopper with discharge tube therefor over the central portion of said disk, and an exhaust blower to create an air blast through the annular passageway opposed to the movement of the coffee, and means for regulating the amount of the blast with the inner vessel inclosed from access to the air.

3. In a coffee refiner, an inner and an outer vessel spaced apart to form an annular passage between them through which the coffee falls by gravity, a perforated disk forming a cover for the inner vessel having an upwardly extending cone-shaped central portion, with means for rotating the disk to project the coffee into said annular passage and to deposit the finer particles within said inner vessel, a hopper and discharge therefrom over the central portion of said perforated disk, and means for creating an air blast through the annular passageway opposed to the movement of the coffee.

4. A coffee refiner comprising a horizontally mounted rotatable disk, having an upwardly extending cone shaped central portion, a delivery tube to deliver the coffee upon said cone, and means to adjust the distance between the end of the tube and the cone to regulate the amount of the delivery opening, an annular receptacle to receive the coffee projected from the disk through which the coffee falls by gravity, and means for creating an air blast through the annular receptacle opposed to the movement of the coffee.

5. A coffee refiner comprising a horizontally mounted rotatable disk, having an upwardly extending cone shaped central portion, a delivery tube to deliver the coffee upon said cone, and means to adjust the distance between the end of the tube and the cone to regulate the amount of the delivery opening, an inner and an outer vessel spaced apart to form an annular passage to receive the coffee projected from the disk through which the coffee falls by gravity, and means for creating an air blast through the annular passage opposed to the movement of the coffee.

6. A coffee refiner, comprising a horizontally mounted rotatable disk having perforations, and provided with an upwardly extending, imperforate, cone-shaped central portion, a delivery tube to deliver the coffee upon said cone, an inner and an outer vessel spaced apart to form an annular passage to receive the coffee projected from the perforated disk through which the coffee falls by gravity, with the inner receptacle provided with a door to retain the coffee dust within the inner receptacle and a suction blower to create an air blast opposed to the movement of the coffee through the annular passage between the two vessels.

7. In a coffee refiner, a horizontally mounted rotatable disk having an upwardly extending cone shaped central portion, a delivery tube to deliver the coffee centrally upon said cone, means for adjusting the length of the delivery tube to vary the delivery opening, and an annular receptacle to receive the coffee projected from the disk.

8. In a coffee refiner, an inner and an outer vessel spaced apart to form an annular passage between them through which the coffee falls by gravity, a perforated disk forming a cover for the inner vessel, with means for rotating the disk to project the coffee into said annular passage and to deposit the finer particles within said inner vessel, with removable receiving cans located below the inner and outer vessels, a grid to support one receiving can above the other, and a door for the inner vessel in contact with the upper receiving can and adapted to open when the upper can is removed to allow the dust to drop into the lower receiving can.

9. In a coffee refiner, an inner and an outer vessel spaced apart to form an annular passage between them through which the coffee falls by gravity, a perforated disk forming a cover for the inner vessel, with means for rotating the disk to project the coffee into said annular passage and to deposit the finer particles within said inner vessel, a hopper and discharge therefrom upon the central portion of said perforated disk, and means for creating an air blast through the annular passageway opposed to the movement of the coffee, with removable cans located below the inner and outer vessels, a grid to support one receiving can above the other, and a door for the inner vessel in contact with the upper receiving can and adapted to open when the upper can is removed to allow the dust to drop into the lower receiving can.

HERBERT L. JOHNSTON.

Attest:
  E. E. EDGAR,
  J. M. SPENCER.

Copies of this patent may be obtained for five cents each, by addressing the "Commissioner of Patents, Washington, D. C."